US009996358B2

(12) United States Patent
Falsafi et al.

(10) Patent No.: US 9,996,358 B2
(45) Date of Patent: Jun. 12, 2018

(54) UNIFIED PREFETCHING INTO INSTRUCTION CACHE AND BRANCH TARGET BUFFER

(71) Applicant: ECOLE POLYTECHNIQUE FEDERALE DE LAUSANNE (EPFL), Lausanne (CH)

(72) Inventors: Babak Falsafi, Chexbres (CH); Ilknur Cansu Kaynak, Renens (CH); Boris Robert Grot, Edinburgh (GB)

(73) Assignee: ECOLE POLYTECHNIQUE FEDERALE DE LAUSANNE, Lausanne (CH)

( * ) Notice: Subject to any disclaimer, the term of this patent is extended or adjusted under 35 U.S.C. 154(b) by 197 days.

(21) Appl. No.: 14/871,417

(22) Filed: Sep. 30, 2015

(65) Prior Publication Data
US 2017/0090935 A1    Mar. 30, 2017

(51) Int. Cl.
*G06F 9/30*    (2018.01)
*G06F 9/38*    (2018.01)
*G06F 12/0875*    (2016.01)

(52) U.S. Cl.
CPC ........ *G06F 9/3806* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| 5,544,342 | A | * | 8/1996 | Dean | G06F 9/3802 711/119 |
| 5,577,217 | A | * | 11/1996 | Hoyt | G06F 9/3848 711/140 |
| 7,337,271 | B2 |   | 2/2008 | Emma et al. | |
| 7,895,422 | B2 | * | 2/2011 | Moyer | G06F 9/3802 712/239 |
| 7,937,573 | B2 | * | 5/2011 | Moyer | G06F 9/30058 712/238 |

(Continued)

OTHER PUBLICATIONS

Ailamaki et al, "DBMSs on a modern processor: Where does time go?" The VLDB Journal, Sep. 1999, pp. 266-277.
(Continued)

*Primary Examiner* — Corey S Faherty
(74) *Attorney, Agent, or Firm* — Hoffman Warnick LLC

(57) ABSTRACT

A system and method of coupling a Branch Target Buffer (BTB) content of a BTB with an instruction cache content of an instruction cache. The method includes: tagging a plurality of target buffer entries that belong to branches within a same instruction block with a corresponding instruction block address and a branch bitmap to indicate individual branches in the block; coupling an overflow buffer with the BTB to accommodate further target buffer entries of instruction blocks, distinct from the plurality of target buffer entries, which have more branches than the bundle is configured to accommodate in the corresponding instruction's bundle in the BTB; and predicting the instructions or the instruction blocks that are likely to be fetched by the core in the future and fetch those instructions from the lower levels of the memory hierarchy proactively by means of a prefetcher.

15 Claims, 5 Drawing Sheets

(56) References Cited

U.S. PATENT DOCUMENTS

2011/0264894 A1* 10/2011 Lin .................... G06F 9/322
                                                          712/207

OTHER PUBLICATIONS

Annavaram et al., "Branch behavior of a commercial oltp workload on intel ia32 processors," Proceedings of the IEEE International Conference on Computer Design: VLSI in Computers and Processors, 2002.

Bonanno et al., "Two level bulk preload branch prediction," Proceedings of the IEEE International Symposium on High Performance Computer Architecture, 2013.

Burcea et al., "Phantom—BTB: A virtualized branch target buffer design," Proceedings of the International Conference on Architectural Support for Programming Languages and Operating Systems, 2009.

Burcea et al., "Predictor virtualization," Proceedings of the International Conference on Architectural Support for Programming Languages and Operating Systems, Mar. 2008.

Butler et al., "Bulldozer: An approach to multithreaded compute performance," Micro, IEEE, vol. 31, No. 2, pp. 6-15, Mar. 2011.

Cavium ThunderX ARM Processors, www.cavium.com, 2015 (3 pages).

Fagin et al., "Partial resolution in branch target buffers," Proceedings of the Annual International Symposium on Microarchitecture, 1995.

Ferdman et al., "Clearing the clouds: a study of emerging scaleout workloads on modern hardware," Proceedings of the International Conference on Architectural Support for Programming Languages and Operating Systems, 2012.

Ferdman et al., "Proactive instruction fetch," Proceedings of the International Symposium on Microarchitecture, 2011.

Ferdman et al., "Temporal instruction fetch streaming," Proceedings of the International Symposium on Microarchitecture, Dec. 2008.

Google Architecture, highscalability.com/google-architecture. Saturday, Nov. 22, 2008 (16 pages).

Hardavellas et al., "Toward dark silicon in servers," Micro, IEEE, vol. 31, No. 4, Jul. 2011.

Hardavellas et al. "Reactive NUCA: Nearoptimal block placement and replication in distributed caches," Proceedings of the International Symposium on Computer Architecture, Jun. 2009.

Hilgendorf et al., "Evaluation of branchprediction methods on traces from commercial applications," IBM J. Res. Dev., vol. 43, No. 4, pp. 579-593, Jul. 1999.

Jain et al., "Linearizing irregular memory accesses for improved correlated prefetching," Proceedings of the 46th Annual IEEE/ACM International Symposium on Microarchitecture, 2013.

HP Moonshot System, www8.hp.com/us/en/products/servers/moonshot, 2015 (12 pages).

Jiménez et al., "The impact of delay on the design of branch predictors," Proceedings of the Annual ACM/IEEE International Symposium on Microarchitecture, 2000.

Jiménez et al., "Dynamic branch prediction with perceptrons," Proceedings of the 7th International Symposium on High-Performance Computer Architecture, 2001.

Kaynak et al., "Shift: Shared history instruction fetch for lean-core server processors," Proceedings of the Annual International Symposium on Microarchitecture, 2013.

Kobayashi et al., "A cost-effective branch target buffer with a two-level table organization," Proceedings of the International Symposium of Low-Power and High-Speed Chips, 1999.

Kolli et al., "Rdip: Return-address-stack directed instruction prefetching," Proceedings of the 46th Annual International Symposium on Microarchitecture, 2013.

Kumar, "Efficiency at scale," First International Workshop on Rack-scale Computing, 2014.

Lotfi-Kamran et al., "Noc-out: Microarchitecting a scale-out processor," Proceedings of the 2012 45th Annual IEEE/ACM International Symposium on Microarchitecture, 2012.

Ranganathan et al., "Performance of database workloads on shared-memory systems with out-of-order processors," Proceedings of the International Conference on Architectural Support for Programming Languages and Operating Systems, Nov. 1998.

Reinman et al., "A scalable front-end architecture for fast instruction delivery," Proceedings of the Annual International Symposium on Computer Architecture, 1999.

Seznec et al., "Design tradeoffs for the alpha EV8 conditional branch predictor," Proceedings of the Annual International Symposium on Computer Architecture, 2002.

Seznec, "The L-TAGE branch predictor," Journal of Instruction Level Parallelism, vol. 9, May 2007, pp. 1-13.

Shah et al., "Sparc t4: A dynamically threaded server-on-a-chip," Micro, IEEE, vol. 32, No. 2, pp. 8-19, Mar. 2012.

Tözün et al., "From A to E: Analyzing TPC's OLTP benchmarks: The obsolete, the ubiquitous, the unexplored," Proceedings of the International Conference on Extending Database Technology, 2013.

* cited by examiner

UNIFIED PREFETCHING INTO INSTRUCTION CACHE AND BRANCH TARGET BUFFER

FIELD OF INVENTION

The present invention is in the field of two performance-critical and storage-intensive structures of servers: the instruction prefetcher and the branch target buffer (BTB).

BACKGROUND OF THE INVENTION

With the end of Dennard scaling, improving server efficiency has become the primary challenge in meeting the ever-increasing performance requirements of the IT infrastructure and data centers. Large instruction working sets are one of the key sources of inefficiency in modern many-core processors [10, 14, 15, 25]. Server software implements complex functionality in a stack of over a dozen layers of services with well-defined abstraction and interfaces from the application all the way through the system. Applications are also increasingly written in higher level languages with scripting compiled to native code resulting in huge instruction working sets.

Large instruction working sets lead to major silicon provisioning for the instruction path to fetch, decode and predict the flow of instructions. The mechanisms increasingly incorporate aggressive control-flow condition [20, 29], target [3, 4], as well as miss [12, 23] and cache reference [11] prediction to improve performance but require prohibitive amounts of on-chip storage to store predictor metadata. The storage requirements are further exacerbated by trends towards more efficient cores in servers (e.g., Moonshot [17], Cavium [7]) and complex software stacks (e.g., Google [13], Facebook [24]) resulting in redundancy in instruction path metadata in many-core server processors. The metadata redundancy is twofold: (i) inter-core redundancy as the predictor metadata of many cores running the same server application overlap, (ii) intra-core redundancy as the predictor metadata for different frontend components overlap significantly.

SUMMARY OF INVENTION

The present description takes a step toward identifying and eliminating the redundancy by focusing on two performance-critical and storage-intensive structures: the instruction prefetcher and the branch target buffer (BTB). We observe that state-of-the-art instruction cache prefetchers achieve extremely high miss coverage through a technique called temporal instruction streaming [11, 12, 23]. The key idea is to record the history of L1-I accesses at the block granularity and subsequently replay the history in order to prefetch the blocks into the instruction cache. The history (i.e., metadata) size needed to accommodate the massive working sets of server workloads is measured in hundreds of kilobytes. It has been proposed to virtualize the history into the last-level cache (LLC) and share it across the cores running the same server application, hence eliminating the inter-core metadata redundancy [21].

On the BTB side, the massive instruction working sets and complex control flow of server applications require tracking many thousands of branch targets, necessitating over 200 KBs of BTB storage capacity for perfect coverage. Since BTBs of that size are impractical for emerging many-core servers, researchers proposed virtualizing the BTB state into the LLC and prefetching it into a small conventional BTB, thus decoupling the large BTB footprint from the core [4].

The present inventors have observed that in both cases— instruction prefetching and BTB prefetching—the prefetcher metadata contains a record of the application's control flow history. In the case of the former, the history is at the instruction block granularity; for the latter, it is at the granularity of individual branches. Because of the different granularities at which history is maintained, existing schemes require dedicated histories and prefetchers for both the instruction cache and the BTB.

A problem that the present invention aims to address is in identifying the redundancy in the control flow metadata for both types of prefetchers and eliminating it by unifying the two histories. To that end, the inventors introduces a confluence system "Confluence"—a frontend design with a single prefetcher and a unified metadata feeding both the L1-I and the BTB. An important challenge Confluence addresses is in managing the disparity in the granularity of control flow required by each of the prefetchers. Whereas an I-cache prefetcher needs to track block-grain addresses, a BTB must reflect fine-grain information of the individual branches.

Confluence overcomes this problem by exploiting a critical insight that a BTB only tracks branch targets, which do not depend on whether or not the branch is taken or even executed. Based on this insight, Confluence maintains the unified control flow history at the block granularity and for each instruction block brought into the L1-I, it eagerly inserts the targets of all PC-relative branches contained in the block into the BTB. Because the control flow exhibits spatial locality, the eager insertion policy provides high intra-block coverage without requiring fine-grain knowledge of the control flow. Finally, to overcome the exorbitant bandwidth required to insert several branches found in a typical cache block into the BTB, Confluence employs a block-based BTB organization, which is also beneficial for reducing the tag overhead.

The contributions of this work are as follows:

We observe that a single block-grain temporal stream is sufficient for prefetching into both L1-I and the BTB, as the instruction blocks encapsulate the instruction-grain information necessary for the BTB. Based on this observation, we introduce Confluence—a unified instruction supply architecture that maintains one set of metadata used by a single prefetcher for feeding both the L1-I and the BTB.

We propose AirBTB, a light-weight block-based BTB design for Confluence that takes advantage of a block-grain temporal stream and spatial locality within blocks to maintain only a small set of BTB targets.

The invention provides a method of coupling a content of a Branch Target Buffer (BTB) with an instruction cache content of an instruction cache comprising: in a block-based BTB organization, tagging a plurality of target buffer entries that belong to branches within a same instruction block with a corresponding instruction block address and a branch bitmap to indicate individual branches in the block, whereby a predefined number of BTB entries tagged with an instruction block address and a bitmap constitute a bundle; coupling an overflow buffer with the BTB to accommodate further BTB entries of instruction blocks, distinct from the plurality of BTB entries, which have more branches than the bundle is configured to accommodate in the corresponding instruction's bundle in the BTB; and predicting the instructions or the instruction blocks that are likely to be fetched by the core in the future and fetch those instructions from the lower levels of the memory hierarchy proactively by means of a prefetcher.

In a further aspect, the invention provides computer program product stored on a computer readable storage medium, which when executed by a computing system, couples content of a Branch Target Buffer (BTB) with an instruction cache content of an instruction cache, the computer program product comprising: program instructions that tag a plurality of target buffer entries in a block-based BTB that belong to branches within a same instruction block with a corresponding instruction block address and a branch bitmap to indicate individual branches in the block, wherein a predefined number of BTB entries tagged with an instruction block address and a bitmap constitute a bundle; program instructions that couple an overflow buffer with the BTB to accommodate further BTB entries of instruction blocks, distinct from the BTB entries, which have more branches than the bundle is configured to accommodate in a corresponding bundle in the BTB; and program instructions that identify predicted instructions or predicted instruction blocks that are likely to be fetched by a core and that fetch the predicted instructions or predicted instruction blocks from lower levels of a memory hierarchy.

In a further aspect, the invention provides a computing system for coupling content of a Branch Target Buffer (BTB) with an instruction cache content of an instruction cache, comprising: a system that tags a plurality of target buffer entries in a block-based BTB that belong to branches within a same instruction block with a corresponding instruction block address and a branch bitmap to indicate individual branches in the block, wherein a predefined number of BTB entries tagged with an instruction block address and a bitmap constitute a bundle; a system that couples an overflow buffer with the BTB to accommodate further BTB entries of instruction blocks, distinct from the BTB entries, which have more branches than the bundle is configured to accommodate in a corresponding bundle in the BTB; and a system that identifies predicted instructions or predicted instruction blocks that are likely to be fetched by a core and that fetches the predicted instructions or predicted instruction blocks from lower levels of a memory hierarchy.

In a preferred embodiment, the block-based BTB organization comprises a same number of sets and ways as the instruction cache to maintain only the bundles of the instruction-cache-resident blocks.

In a further preferred embodiment, the method further comprises inserting an instruction block into the instruction cache; pre-decoding the instructions in the instruction block to identify branch instructions and calculate target addresses of the branch instructions; and inserting the branches identified within the block into the bundle of the corresponding instruction block.

In a further preferred embodiment, the method further comprises evicting an instruction block from the instruction cache; and evicting the corresponding bundle from the BTB.

In a further preferred embodiment, a single common prefetcher performs insertions into the instruction cache and into the BTB in sync.

BRIEF DESCRIPTION OF THE DRAWINGS

The invention will be better understood from the description of example embodiments and in view of the drawings in which.

Figure 1:
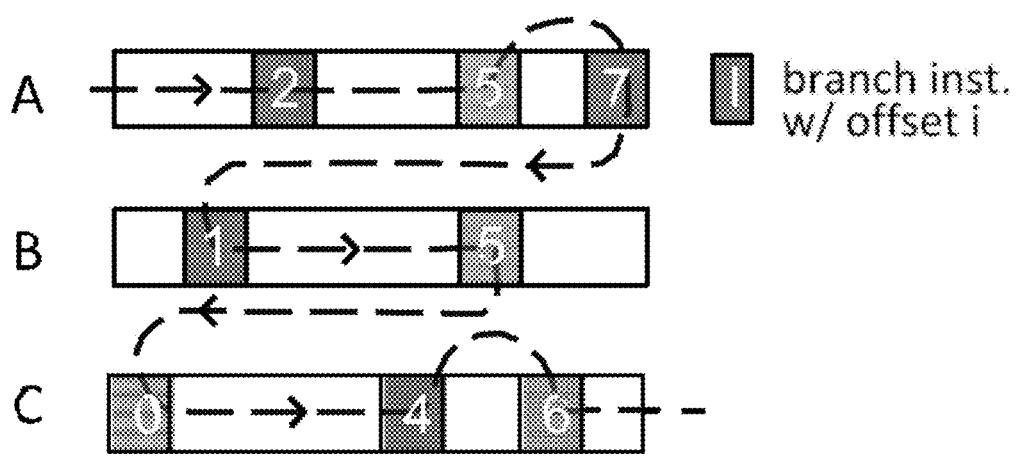
FIG. 1 illustrates control flow traversing instruction blocks A, B, C.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

1. Metadata Redundancy in Instruction Supply Path

Prior work has shown that server workloads exhibit large instruction working sets defying the limited capacities of the instruction cache and the branch predictor tables, which have strict low access-latency requirements [1, 10, 26, 31]. Consequently, the frequent misses in the instruction cache and branch predictors introduce one of the major performance bottlenecks in server processors causing frequent misfetches or fetch stalls [1, 2, 3, 4, 16].

Prefetching is an effective mechanism to predict future misses. The control flow in server applications is highly recurring at the request level due to serving the same types of requests perpetually. Because of the recurring control flow, the core frontend generates repeating sequences of instruction addresses. The instruction addresses that appear together and in the same order are temporally correlated and constitute a temporal stream. For example, in the address sequence X,Y,Z,M,X,Y,Z,Q, the subsequence X,Y,Z is a temporal stream. Prefetchers exploit temporal correlation by recording sequences of instruction references and replaying those sequences to predict future misses.

Instruction Prefetching: The low access latency requirements of primary caches preclude large instruction caches that can accommodate multi-megabyte instruction working sets of server applications. Avoiding fetch stalls stemming from high L1-I miss rates necessitates effective instruction prefetching. The state-of-the-art instruction prefetchers exploit temporal correlation between instruction cache references by recording and replaying temporal streams of L1-I accesses at instruction-block granularity [11, 12, 21, 23]. For example, for the control flow graph shown in FIG. 1 traversing cache blocks A, B, C, stream-based instruction prefetchers record the block-addresses A, B, C. This way, every prediction made by the prefetcher triggers the fetch of a whole instruction block into L1-I. Stream-based instruction prefetchers can eliminate over 90% of the L1-I misses in server applications, providing near-perfect L1-I hit rates [11, 21].

However, the aggregate storage requirements of stream-based prefetchers scale with the application working set size and the number cores, commonly exceeding 200 KB per core. To mitigate the storage overhead, the most recent work [21], SHIFT, proposes embedding the prefetcher metadata into the LLC and sharing it across the cores running the same server application, thereby eliminating inter-core metadata redundancy.

BTB Metadata Prefetching: Similar to L1-I, the BTB needs to capture the target addresses of all taken branches in the massive application working set of server applications to provide the pipeline with a stream of useful instructions to execute. In the case of a BTB miss for a taken branch, the pipeline is fed with the instructions following the branch instruction sequentially, causing a squash when the pipeline detects the misfetch.

To alleviate frequent BTB misses in a cost-effective manner, the state-of-the-art BTB prefetcher, PhantomBTB [4], exploits temporal correlation between BTB misses. PhantomBTB records the sequence of individual branches that cause misses in the BTB and replays these branch sequences to predict future misses. For instance, for the control flow graph shown in FIG. 1, PhantomBTB records the BTB entries of branches A2, A5, A7, B1, B5, C0, C4, C6 in its history. The history is virtualized in the LLC, so it does not necessitate a dedicated history table.

Figure 2:
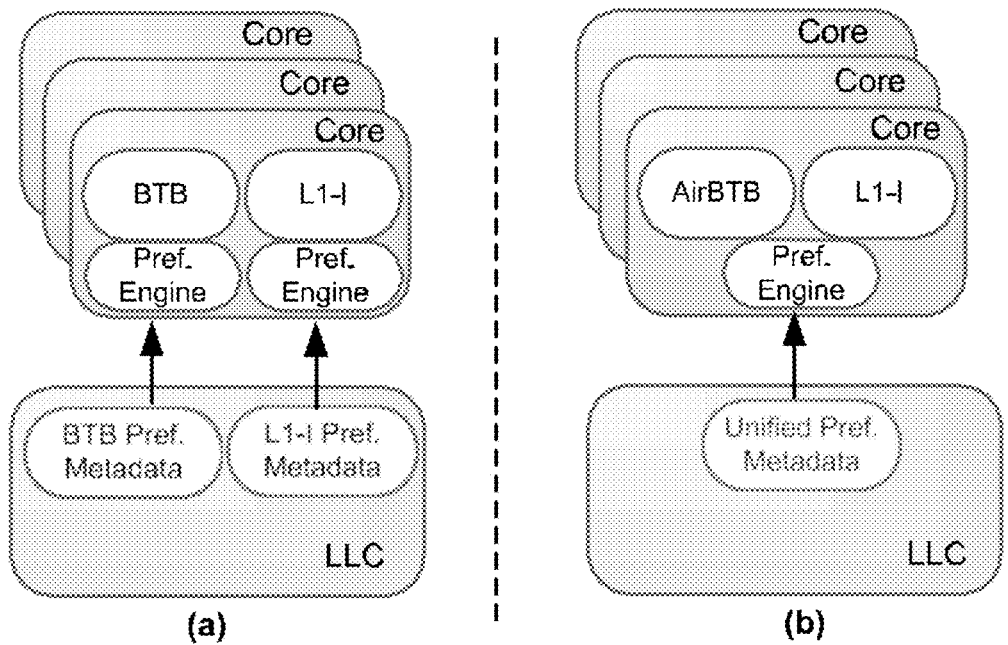
FIG. 2 contains an illustration of high-level organization of cores around (a) disparate BTB and L1-I prefetcher metadata (b) confluence with unified and shared prefetcher metadata.

Summary: Achieving a high-performance instruction-supply path requires effective L1-I and BTB prefetching. Essentially, both the L1-I prefetcher and the BTB prefetcher strive to capture the entire control-flow history of an application with their prediction metadata maintained independently as shown in FIG. 2(*a*). While exploiting temporal correlation with history of temporal streams at block granularity can eliminate a substantial percentage of L1-I misses, a disparate BTB prefetcher maintaining history at branch granularity provides only mediocre miss coverage for BTB.

In this work, with Confluence, we seek to achieve a near-perfect instruction supply path, while eliminating the metadata redundancy within a core and across cores by unifying the prefetching mechanism for L1-I and BTB and relying on the shared metadata across cores as shown in FIG. 2(*b*).

2. Confluence: Unifying Instruction Supply Metadata

Confluence unifies the prefetching metadata to feed BTB and L1-I synchronously. Confluence relies on an existing instruction prefetcher, which provides high miss coverage for L1-I. However, exploiting an L1-I prefetcher that tracks control flow at the block granularity for filling the BTB requires rethinking the BTB organization. To that end, we introduce AirBTB, a lightweight BTB design whose content mirrors that of the L1-I, thus enabling a single control flow history to be used for prefetching into both structures.

To overcome the granularity mismatch between cache blocks and individual branches, Confluence exploits spatial locality within instruction blocks (i.e., the likelihood of multiple branches instructions being executed and taken in a block) by eagerly inserting all of the BTB entries of a block into AirBTB upon the arrival of a block at the L1-I.

Figure 3:
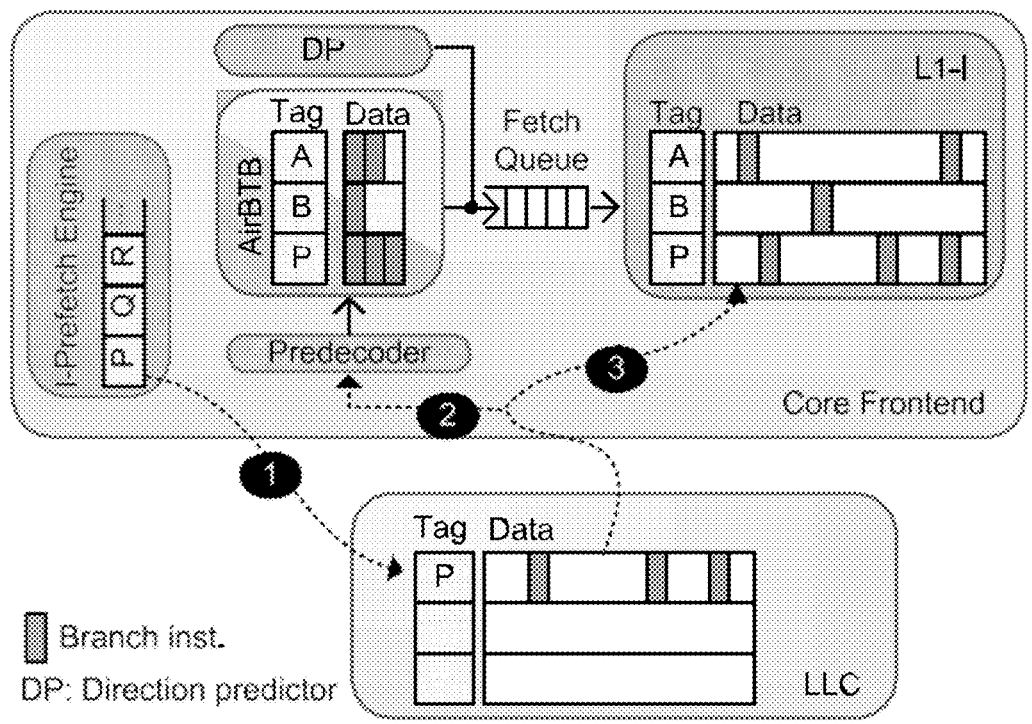
FIG. 3 contains an illustration of core frontend organization and instruction flow.

As shown in FIG. 3, which contains an illustration of core frontend organization and instruction flow, Confluence synchronizes the insertions and the evictions into AirBTB with the L1-I, thus guaranteeing that the set of blocks present in both structures is identical. As the blocks are proactively fetched from lower levels of the cache hierarchy by the prefetch engine (step 1), Confluence generates the BTB metadata by predecoding the branch type and target displacement field encoded in the branch instructions in a block and inserts the metadata into AirBTB (step 2) and the instruction block itself into the L1-I (step 3).

In the rest of this section, we first describe the AirBTB organization, the insertion and replacement operations in AirBTB and how AirBTB operates within the branch prediction unit. Then, we briefly describe the state-of-the-art instruction prefetcher, SHIFT [21], which enables Confluence.

3. AirBTB Organization

AirBTB is organized as a set-associative cache. Because AirBTB's content is in sync with the L1-I, as shown in FIG. 3, AirBTB maintains a bundle for each block in L1-I. Each bundle comprises a fixed number of branch entries that belong to the branch instructions in a block.

In a conventional BTB design, each entry for a branch instruction (or basic block entry) is individually tagged, necessitating to maintain a tag for each individual entry. Because the branches in a bundle in AirBTB belong to the same instruction block, the branch addresses share the same high-order bits, which constitute the address of the block. To exploit the commonality of high-order bits of the branch instruction addresses in a bundle, AirBTB maintains a single tag for a bundle, which is the instruction block address that contains the branches. We refer to this organization as block-based organization. The block-based organization amortizes the tag cost across the branches in the same block. Moreover, the block-based organization avoids conflict misses between the branch entries that belong to two different blocks resident in the L1-I.

Figure 4:
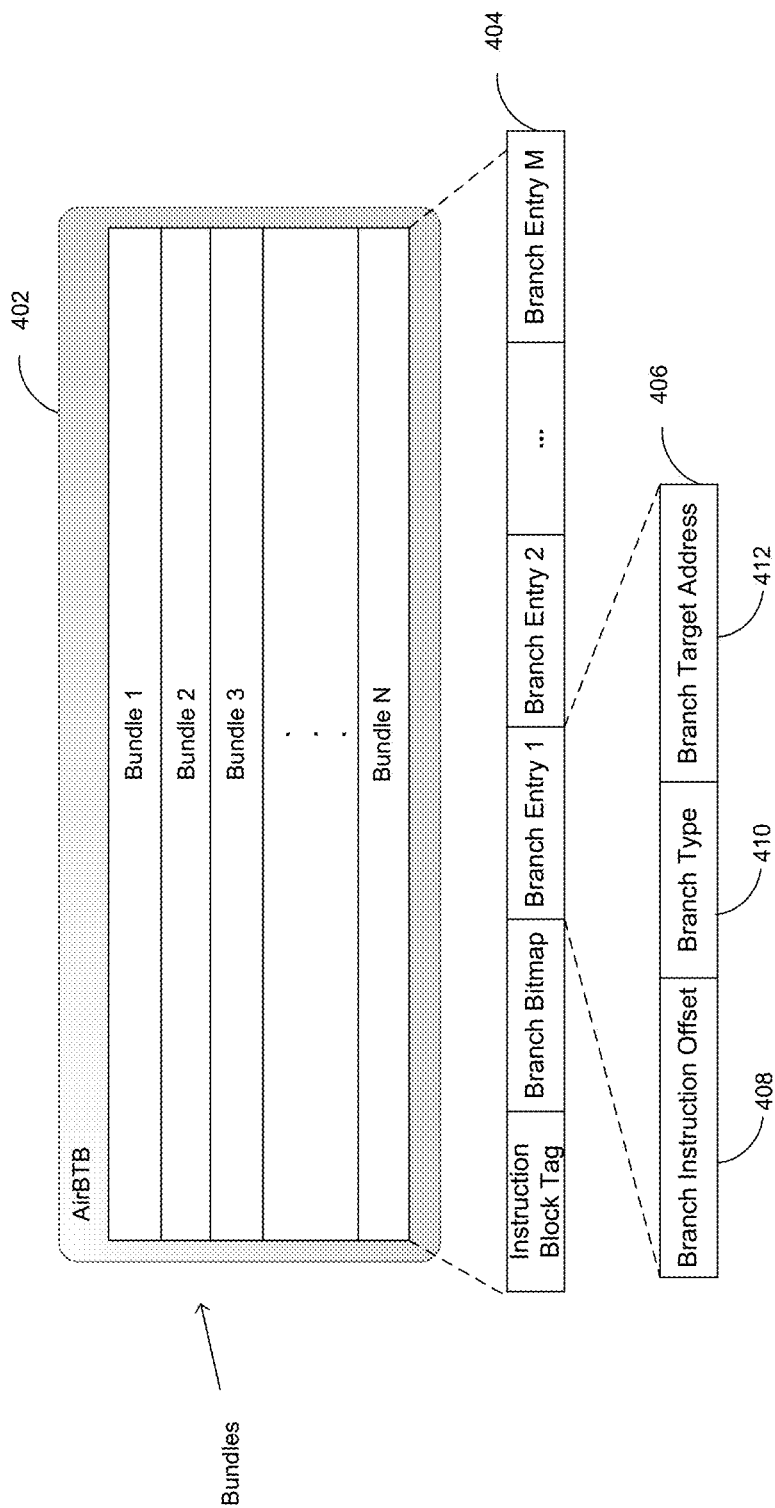
FIG. 4 shows an AirBTB organization.

FIG. 4 depicts the AirBTB organization 402 consisting of N bundles. Each bundle 404 contains an instruction block tag, which comprises an instruction block address and entries of M branches, which fall into the same instruction block. The branch bitmap in each bundle is a bit vector that identifies the branch instructions in an instruction block. The branch bitmap maintains the knowledge of basic block boundaries within a block allowing for providing a prediction with multiple instructions in a single lookup. Each branch entry 406 in a bundle contains the offset of a branch instruction 408 within the cache block, the branch type 410 (i.e., conditional, unconditional, indirect, return) and the branch target address 412 (if the branch is a PC-relative branch, which is mostly the case).

Because each bundle maintains a fixed number of branch entries, L1-I blocks with more branch instructions can overflow their bundles. Such overflows happen very rarely if bundles are sized correctly to accommodate all the branches in an instruction block in the common case. To handle overflows, AirBTB is backed with a fully-associative overflow buffer consisting of a fixed number of entries. Each entry is tagged with full branch instruction address and maintains the branch type and target address. The branch bitmap in a bundle also keeps track of the the branch entries in a block that overflowed to the overflow buffer.

4. AirBTB Insertions and Replacements

To provide the synchronization with the L1-I, Confluence inserts the branch entries of a block into AirBTB upon the insertion of the block into the L1-I. By relying on spatial locality, Confluence inserts all the branch entries of a block eagerly into AirBTB. This way, Confluence overprovisions for the worst case where each branch entry might be needed by the branch prediction unit, even though the control flow might diverge to a different block before all the entries in the current block are used by the branch prediction unit.

For each block fetched into the L1-I, Confluence necessitates identifying the branch instructions in a block, extracting the type and relative displacement field encoded in each branch instruction. Confluence relies on predecoding to generate the BTB metadata of the branches in the block before the block is inserted into the L1-I. The predecoder requires a few cycles to perform the branch scan within a cache block before the block is inserted into the cache [6, 30]. However, this latency is not on the critical path if the block is fetched into the L1-I earlier than it is needed with the guidance of the instruction prefetcher.

Figure 5:
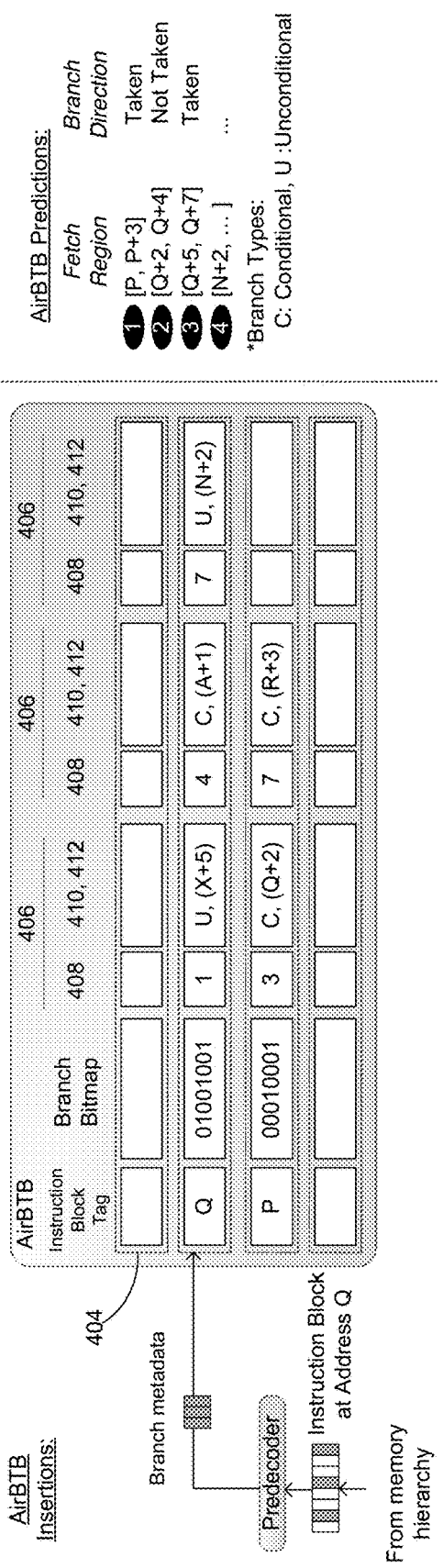
FIG. 5 shows AirBTB operations.

As shown in FIG. 5 on the left-hand side, for each instruction block fetched from the LLC (or lower levels of the memory hierarchy), Confluence allocates a new bundle and inserts the associated branch metadata (i.e., branch instruction offset, branch type and branch target address) into the branch entries in the bundle, while setting the bits of the corresponding branches in the branch bitmap, until the bundle becomes full. If the block overflows its bundle, the entries that cannot be accommodated by the bundle are inserted into the overflow buffer, while their corresponding bits are also set in the bitmap.

Upon the insertion of a new bundle due to a newly fetched instruction block, the bundle evicted from AirBTB belongs to the instruction block evicted from the L1-I. This way, AirBTB maintains only the entries of the branch instructions resident in the L1-I.

5. AirBTB Operation

Every lookup in AirBTB, in cooperation with the branch direction predictor, provides a fetch region, the addresses of the instructions starting and ending a basic block, to be fetched from the L1-I. In this section, we explain how AirBTB performs predictions in collaboration with the direction predictor in detail.

FIG. 5 (the right-hand side) lists the predictions made step by step. Let's say the instruction stream starts with address P. AirBTB first performs a lookup for block P and, upon a match, identifies the first subsequent branch instruction that comes after instruction P by scanning the branch bitmap. In our example, the first branch instruction after P is the instruction at address P+3. The fetch region, P to P+3, is sent to the instruction fetch unit and the target address for the branch instruction P+3 is read out. Next, a direction prediction is made for the conditional branch at address P+3 by the direction predictor and a lookup is performed for P+3's target address Q+2 in AirBTB. Because the conditional branch is predicted taken, the next fetch region provided by the target address' bundle, Q+2 to Q+4, is sent to the fetch unit. Then, because the conditional branch Q+4 is predicted not taken, the next fetch region is Q+5 to Q+7.

If a branch is a return or indirect branch, the target prediction is made by the return address stack or indirect target cache respectively. If a branch indicated by the branch bitmap is not found in one of branch entries in the bundle, AirBTB performs a lookup for that branch instruction in the overflow buffer. The rest of the prediction operation is exactly the same for branch entries found in the overflow buffer.

If AirBTB cannot find a block or a branch entry indicated by a branch bitmap (because the entry was evicted from the overflow buffer), it speculatively provides a fetch region consisting of a predefined number of instructions following the last predicted target address, until it is redirected to the correct fetch stream by the core.

6. Prefetcher Microarchitecture

Providing the pipeline with a continuous stream of useful instructions to execute necessitates the branch predictor to be highly accurate. For BTB, accuracy corresponds to being able to identify all the branches and provide the targets of predicted taken branches as the branch prediction unit explores the future control flow. If the branch prediction unit does not identify instructions as branches because they are not present in the BTB, it speculatively provides the fetch unit with sequential fixed-size fetch regions, which become misfetches if there are actually taken branches in those sequential fetch regions. To avoid such misfetches, AirBTB requires a mechanism to predict the future control flow, so that it can eagerly insert the branch entries that will be needed soon.

The key enabler of AirBTB with a high hit ratio is an effective and accurate instruction prefetcher as AirBTB leverages the instruction prefetcher to populate its limited storage with branch entries that are likely to be referenced soon. Confluence leverages SHIFT [21], the state-of-the-art stream-based instruction prefetcher, which amortizes its history storage cost across many cores running the same application as described in the Section "Metadata Redundancy in Instruction Supply Path". However, it is important to note that, any instruction prefetcher that is used to prefetch instruction blocks into the instruction cache can be leveraged to populate AirBTB's content.

SHIFT consists of two components to maintain the history of instruction streams; the history buffer and the index table. The history buffer maintains the history of the L1-I access stream generated by one core at block granularity in a circular buffer and the index table provides the location of the most recent occurrence of an instruction block address in the circular buffer for fast lookups. The content of these two components are generated by only one core and used by all cores running a common server application in a many-core server processor. To enable sharing and eliminate the need for a dedicated history table, the history is maintain in the LLC leveraging the virtualization framework [5].

A miss in the L1-I initiates a lookup in the index table to find the most recent occurrence of that block address in the history buffer. Upon a hit in the index table, the prefetch engine fetches prediction metadata from the history buffer starting from the location that is pointed by the index table entry. The prefetch engine uses this metadata to predict future L1-I misses, thus prefetches the instruction blocks whose addresses are in the metadata. As predictions turn out to be correct (i.e., the predicted instruction blocks are demanded by the core), more block addresses are read from the metadata and used for further predictions.

7. Further Embodiments

Branch target buffer is the key component that allows the branch prediction unit to run ahead of the core and provide the core with a continuous instruction stream to be executed along with the branch direction predictor to avoid the bubbles in the pipeline that are caused by taken branch instructions.

Because the branch predictor is on the critical path, a large BTB with several cycles of access latency greatly penalizes the rate at which the instruction stream is delivered to the core. One way of reducing the capacity requirement of the BTB is to maintain fewer bits in the tag of a BTB entry instead of uniquely identifying a basic block with its full tag [9], making BTB entries susceptible to aliasing. Another way is to maintain only the offsets of the fall-through and target addresses from the basic-block address instead of their full addresses, since the distance between the basic-block address and the fallthrough or target address is expected to be small [22, 27]. Although these compression techniques help to reduce the BTB capacity requirements to some extent, they cannot mitigate the number of individual entries that need to be maintained in the BTB to capture the entire instruction working set of an application, which is the fundamental problem for server applications.

To mitigate the access latency of large predictor tables, hierarchical branch predictors provide low access latencies with a smaller but less accurate first-level predictor in the common case and leverage a larger but slower second-level predictor to increase accuracy [6, 19, 28]. The second-level table overwrites the prediction of the first-level table in case of disagreement at a later stage.

While hierarchical predictors provide a trade-off between accuracy and delay, they still incur high latencies to access lower levels of the hierarchy. To hide the latency of accesses to lower-level predictor tables, several studies proposed prefetching the predictor metadata from the lower-level predictor table into the first-level predictor table. To do so, PhantomBTB exploits the temporal correlation between BTB misses as misses to a group of entries are likely to recur together in the future due to the repetitive control flow in applications [4]. Emma et al. also propose spilling groups of temporally correlated BTB entries to the lower levels of the cache hierarchy and tagging each group with the instruction block address of the first instruction in the group [8]. This way, upon a miss in the instruction cache, the corresponding BTB entry group can be loaded from the secondary table into the primary table.

In a similar vein, bulk preload [3] fetches a group of BTB entries that belong to a spatial code region of a predefined size upon a miss in that region. Although bulk preloading of BTB entries exploits the spatial correlation between BTB entries in a large code region, it falls short of capturing the temporal correlation between BTB entries in different regions.

To eliminate or mitigate the BTB storage overhead, cores with hardware multithreading [6, 30] employ predecoding to scan the branches in the instruction cache blocks that are fetched into L1-I, precompute the target addresses of the branches and modify the branch instructions to store the lower bits of the target address before they are inserted into the instruction cache. This way, the target address of a taken branch is formed with a simple concatenation of the branch PC and the low order bits of the target address, right after the instruction is fetched from the L1-I. Unfortunately, this approach dramatically hurts single-thread performance, fetching a block from L1-I and scanning it to identify branch instructions takes several cycles and results in bubbles in the pipeline.

One of the key ideas employed in Confluence, syncing the BTB content with the instruction cache, is similar to fetching the data prefetcher metadata of memory pages from off-chip to on-chip upon a TLB miss to a particular page [18].

8. Conclusion

Large instruction working sets of server applications are beyond the reach of practical BTB and L1-I sizes due to their strictly low access latency requirements. Frequent misses in BTB and L1-I result in frequent misfetches and instruction fetch stalls dramatically hurting the performance of server applications. In response, prior research proposed discrete prefetchers for BTB and L1-I, whose metadata essentially capture the same control flow exhibited by an application.

This work proposes Confluence, a new front-end design, which synchronizes the BTB and L1-I content to leverage a single prefetcher and unified prefetcher metadata to prefetch for both BTB and L1-I by relying on a highly accurate instruction prefetcher.

Figure 6:
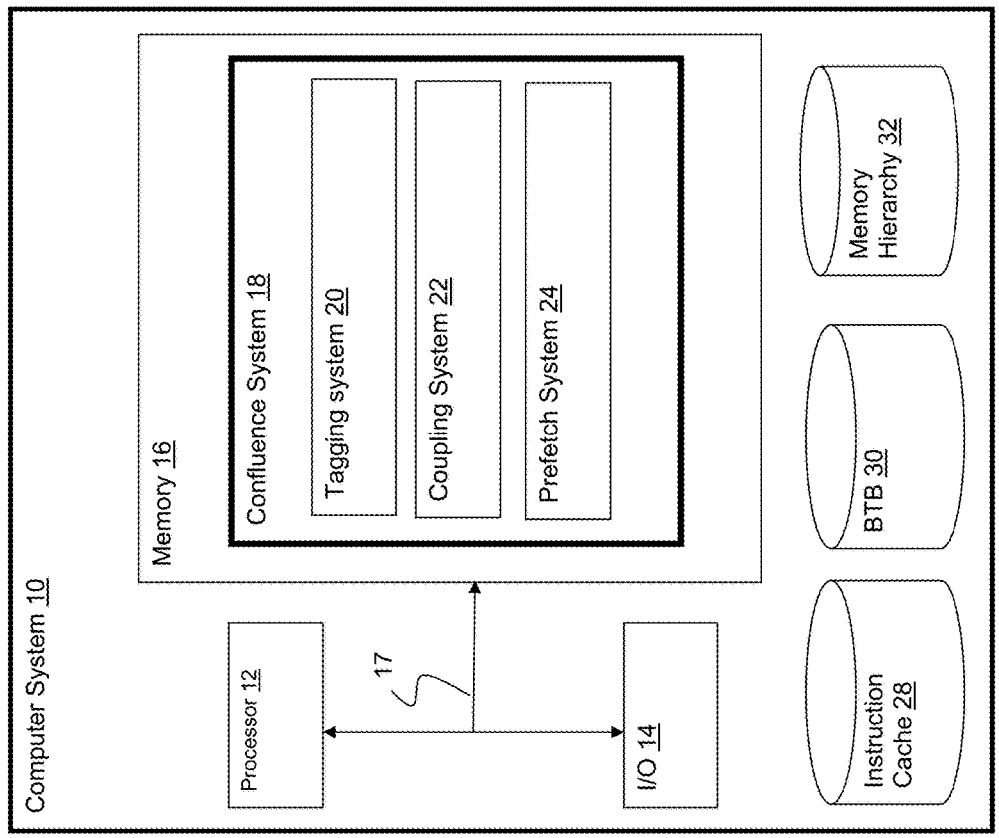
FIG. 6 depicts a computer system according to embodiments.

FIG. 6 a computer system 10 showing an illustrative embodiment of a confluence system 18. As shown confluence system 18 includes a tagging system 20 that tags a plurality of target buffer entries in a block-based BTB organization 30 that belong to branches within a same instruction block with a corresponding instruction block address and a branch bitmap to indicate individual branches in the block. A predefined number of BTB entries tagged with an instruction block address and a bitmap constitute a bundle.

Also included is a coupling system 22 that couples an overflow buffer with the BTB 30 to accommodate further BTB entries of instruction blocks, distinct from the BTB entries, which have more branches than the bundle is configured to accommodate in a corresponding bundle in the BTB 30.

A prefetch system 24 is also then provided to identify predicted instructions or predicted instruction blocks that are likely to be fetched by a core (e.g., CPU) and that fetches the predicted instructions or predicted instruction blocks from lower levels of a memory hierarchy 32.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable, programmable, read-only memory (EPROM or Flash memory), a static random access memory (SRAM), a portable compact disc read-only memory (CD-ROM), a digital versatile disc (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, such as the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely or partly on a computer, device and/or apparatus, as a stand-alone software package, partly on a computer and partly on a remote computer or entirely on the remote computer or server. In the latter scenario, the remote computer may be connected to the user's computer through any type of network, including a local area network (LAN), a wide area network (WAN), geo-fence, Broadband wireless, near field wireless, personal area network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 6 depicts an illustrative computing system 10 that may comprise any type of computing device and, for example, includes at least one processor, memory, an input/output (I/O) 14 (e.g., one or more I/O interfaces and/or devices), and a communications pathway 17. In general, processor(s) 12 execute program code, such as confluence 12, which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. To this extent, confluence system 18 can manage a set of interfaces (e.g., graphical user interfaces, application program interfaces, etc.) that enable humans and/or other systems to interact with confluence system 18. Further, confluence system 18 can manage (e.g., store, retrieve, create, manipulate, organize, present, etc.) data using any solution.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

REFERENCES

[1] A. Ailamaki, D. J. DeWitt, M. D. Hill, and D. A. Wood, "DBMSs on a modern processor: Where does time go?" in *The VLDB Journal, September* 1999, pp. 266-277.

[2] M. Annavaram, T. Diep, and J. Shen, "Branch behavior of a commercial oltp workload on intel ia32 processors," in *Proceedings of the IEEE International Conference on Computer Design: VLSI in Computers and Processors,* 2002.

[3] J. Bonanno, A. Collura, D. Lipetz, U. Mayer, B. Prasky, and A. Saporito, "Two level bulk preload branch prediction," in *Proceedings of the IEEE International Symposium on High Performance Computer Architecture,* 2013.

[4] I. Burcea and A. Moshovos, "Phantom-BTB: A virtualized branch target buffer design," in *Proceedings of the International Conference on Architectural Support for Programming Languages and Operating Systems,* 2009.

[5] I. Burcea, S. Somogyi, A. Moshovos, and B. Falsafi, "Predictor virtualization," in *Proceedings of the International Conference on Architectural Support for Programming Languages and Operating Systems,* March

[6] M. Butler, L. Barnes, D. Sarma, and B. Gelinas, "Bulldozer: An approach to multithreaded compute performance," *Micro, IEEE, vol.* 31, no. 2, pp. 6-15, March 2011.

[7] Cavium ThunderX ARM Processors, www.cavium.com.

[8] P. Emma, A. Hartstein, B. Prasky, T. Puzak, M. Qureshi, and V. Srinivasan, "Context look ahead storage structures," Feb. 26 2008, IBM, U.S. Pat. No. 7,337,271.

[9] B. Fagin and K. Russell, "Partial resolution in branch target buffers," in Proceedings of the Annual International Symposium on Microarchitecture, 1995.

[10] M. Ferdman, A. Adileh, O. Kocberber, S. Volos, M. Alisafaee, D. Jevdjic, C. Kaynak, A. D. Popescu, A. Ailamaki, and B. Falsafi, "Clearing the clouds: a study of emerging scale-out workloads on modern hardware," in *Proceedings of the International Conference on Architectural Support for Programming Languages and Operating Systems*, 2012.

[11] M. Ferdman, C. Kaynak, and B. Falsafi, "Proactive instruction fetch," in *Proceedings of the International Symposium on Microarchitecture*, 2011.

[12] M. Ferdman, T. F. Wenisch, A. Ailamaki, B. Falsafi, and A. Moshovos, "Temporal instruction fetch streaming," in *Proceedings of the International Symposium on Microarchitecture*, December 2008.

[13] Google Architecture, highscalability.com/google-architecture.

[14] N. Hardavellas, M. Ferdman, B. Falsafi, and A. Ailamaki, "Toward dark silicon in servers," *Micro, IEEE*, vol. 31, no. 4, July 2011.

[15] N. Hardavellas, M. Ferdman, B. Falsafi, and A. Ailamaki, "Reactive NUCA: Near-optimal block placement and replication in distributed caches," in *Proceedings of the International Symposium on Computer Architecture*, June 2009.

[16] R. B. Hilgendorf, G. J. Heim, and W. Rosenstiel, "Evaluation ofbranchprediction methods on traces from commercial applications," *IBM J. Res. Dev.*, vol. 43, no. 4, pp. 579-593, July 1999.

[17] HP Moonshot System, www8.hp.com/us/en/products/servers/moonshot.

[18] A. Jain and C. Lin, "Linearizing irregular memory accesses for improved correlated prefetching," in *Proceedings of the 46th Annual IEEE/ACM International Symposium on Microarchitecture*, 2013.

[19] D. A. Jiménez, S. W. Keckler, and C. Lin, "The impact of delay on the design of branch predictors," in *Proceedings of the Annual ACM/IEEE International Symposium on Microarchitecture*, 2000.

[20] D. A. Jiménez and C. Lin, "Dynamic branch prediction with perceptrons," in *Proceedings of the 7th International Symposium on High-Performance Computer Architecture*, 2001.

[21] C. Kaynak, B. Grot, and B. Falsafi, "Shift: Shared history instruction fetch for lean-core server processors," in *Proceedings of the Annual International Symposium on Microarchitecture*, 2013.

[22] R. Kobayashi, Y. Yamada, H. Ando, and T. Shimada, "A cost-effective branch target buffer with a two-level table organization," in *Proceedings of the International Symposium of Low-Power and High-Speed Chips*, 1999.

[23] A. Kolli, A. Saidi, and T. F. Wenisch, "Rdip: Return-address-stack directed instruction prefetching," in *Proceedings of the 46th Annual International Symposium on Microarchitecture*, 2013.

[24] S. Kumar, "Efficiency at scale," in *First International Workshop on Rack-scale Computing*, 2014.

[25] P. Lotfi-Kamran, B. Grot, and B. Falsafi, "Noc-out: Microarchitecting a scale-out processor," in *Proceedings of the 2012 45th Annual IEEE/ACM International Symposium on Microarchitecture*, 2012.

[26] P. Ranganathan, K. Gharachorloo, S. V. Adve, and L. A. Barroso, "Performance of database workloads on shared-memory systems with out-of-order processors," in *Proceedings of the International Conference on Architectural Support for Programming Languages and Operating Systems*, November 1998.

[27] G. Reinman, T. Austin, and B. Calder, "A scalable front-end architecture for fast instruction delivery," in *Proceedings of the Annual International Symposium on Computer Architecture*, 1999.

[28] A. Seznec, S. Felix, V. Krishnan, and Y. Sazeides, "Design tradeoffs for the alpha EV8 conditional branch predictor," in *Proceedings of the Annual International Symposium on Computer Architecture*, 2002.

[29] A. Seznec, "The L-TAGE branch predictor," *Journal of Instruction Level Parallelism*, May 2007.

[30] M. Shah, R. Golla, G. Grohoski, P. Jordan, J. Barreh, J. Brooks, M. Greenberg, G. Levinsky, M. Luttrell, C. Olson, Z. Samoail, M. Smittle, and T. Ziaja, "Sparc t4: A dynamically threaded server-on-a-chip," *Micro, IEEE*, vol. 32, no. 2, pp. 8-19, March 2012.

[31] P. Tözün, I. Pandis, C. Kaynak, D. Jevdjic, and A. Ailamaki, "From A to E: Analyzing TPC's OLTP benchmarks: The obsolete, the ubiquitous, the unexplored," in *Proceedings of the International Conference on Extending Database Technology*, 2013.

The invention claimed is:

1. A method of coupling a content of a Branch Target Buffer (BTB) with an instruction cache content of an instruction cache comprising:
   in a block-based BTB, tagging a plurality of target buffer entries that belong to branches within a same instruction block with a corresponding instruction block address and a branch bitmap to indicate individual branches in the block, whereby a predefined number of BTB entries tagged with an instruction block address and a bitmap constitute a bundle;
   coupling an overflow buffer with the BTB to accommodate further BTB entries of instruction blocks, distinct from the plurality of BTB entries, which have more branches than the bundle is configured to accommodate in a corresponding instruction bundle in the BTB; and
   predicting instructions or instruction blocks that are likely to be fetched by a core and fetching those instructions from lower levels of a memory hierarchy.

2. The method of claim 1, wherein organization of the block-based BTB comprises a same number of sets and ways as the instruction cache to maintain only the bundles of the instruction-cache-resident blocks.

3. The method of claim 1, further comprising
   inserting an instruction block into the instruction cache;
   pre-decoding the instructions in the instruction block to identify branch instructions and calculate target addresses of the branch instructions; and
   inserting the branches identified within the block into the bundle of the corresponding instruction block.

4. The method of claim 1, further comprising
   evicting an instruction block from the instruction cache; and
   evicting the corresponding bundle from the BTB.

5. The method of claim 1, wherein a single common prefetcher performs insertions into the instruction cache and into the BTB in sync.

6. A computing system for coupling content of a Branch Target Buffer (BTB) with an instruction cache content of an instruction cache, comprising:
   a system that tags a plurality of target buffer entries in a block-based BTB that belong to branches within a same instruction block with a corresponding instruction block address and a branch bitmap to indicate individual branches in the block, wherein a predefined number of BTB entries tagged with an instruction block address and a bitmap constitute a bundle;

a system that couples an overflow buffer with the BTB to accommodate further BTB entries of instruction blocks, distinct from the BTB entries, which have more branches than the bundle is configured to accommodate in a corresponding bundle in the BTB; and a system that identifies predicted instructions or predicted instruction blocks that are likely to be fetched by a core and that fetches the predicted instructions or predicted instruction blocks from lower levels of a memory hierarchy.

7. The computing system of claim 6, wherein the block-based BTB comprises a same number of sets and ways as the instruction cache to maintain only the bundles of the instruction-cache-resident blocks.

8. The computing system of claim 6, further comprising:
a system that inserts an instruction block into the instruction cache;
a system that pre-decodes the instructions in the instruction block to identify branch instructions and calculates target addresses of the branch instructions; and
a system that inserts the branches identified within the block into the bundle of the corresponding instruction block.

9. The computing system of claim 6, further comprising:
a system that evicts an instruction block from the instruction cache; and
a system that evicts the corresponding bundle from the BTB.

10. The computing system of claim 6, wherein a system comprising a single common prefetcher performs insertions into the instruction cache and into the BTB in sync.

11. A computer program product stored on a non-transitory computer readable storage medium, which when executed by a computing system, couples content of a Branch Target Buffer (BTB) with an instruction cache content of an instruction cache, the computer program product comprising:
program instructions that tag a plurality of target buffer entries in a block-based BTB that belong to branches within a same instruction block with a corresponding instruction block address and a branch bitmap to indicate individual branches in the block, wherein a predefined number of BTB entries tagged with an instruction block address and a bitmap constitute a bundle;
program instructions that couple an overflow buffer with the BTB to accommodate further BTB entries of instruction blocks, distinct from the BTB entries, which have more branches than the bundle is configured to accommodate in a corresponding bundle in the BTB; and
program instructions that identify predicted instructions or predicted instruction blocks that are likely to be fetched by a core and that fetch the predicted instructions or predicted instruction blocks from lower levels of a memory hierarchy.

12. The computer program product of claim 11, wherein the block-based BTB comprises a same number of sets and ways as the instruction cache to maintain only the bundles of the instruction-cache-resident blocks.

13. The computer program product of claim 11, further comprising
program instructions that insert an instruction block into the instruction cache;
program instructions that pre-decode the instructions in the instruction block to identify branch instructions and calculate target addresses of the branch instructions; and
program instructions that insert the branches identified within the block into the bundle of the corresponding instruction block.

14. The computer program product of claim 11, further comprising
program instructions that evict an instruction block from the instruction cache; and
program instruction that evict the corresponding bundle from the BTB.

15. The computer program of claim 11, program instructions implementing a single common prefetcher that performs insertions into the instruction cache and into the BTB in sync.

* * * * *